United States Patent
Pedersen

(10) Patent No.: US 10,315,789 B2
(45) Date of Patent: Jun. 11, 2019

(54) SEALING AND CUTTING UNIT FOR A FORM FILL SEAL MACHINE

(71) Applicant: Gram Equipment A/S, Vojens (DK)

(72) Inventor: Steen Pedersen, Haderslev (DK)

(73) Assignee: GRAM EQUIPMENT A/S, Vojens (DK)

(*) Notice: Subject to any disclaimer, the term of this patent is extended or adjusted under 35 U.S.C. 154(b) by 529 days.

(21) Appl. No.: 14/646,122

(22) PCT Filed: Nov. 20, 2013

(86) PCT No.: PCT/DK2013/050390
§ 371 (c)(1),
(2) Date: May 20, 2015

(87) PCT Pub. No.: WO2014/079457
PCT Pub. Date: May 30, 2014

(65) Prior Publication Data
US 2015/0298833 A1    Oct. 22, 2015

(30) Foreign Application Priority Data
Nov. 20, 2012  (DK) ................................ 2012 70717

(51) Int. Cl.
*B29C 65/74*     (2006.01)
*B65B 9/067*     (2012.01)
(Continued)

(52) U.S. Cl.
CPC ................ *B65B 9/067* (2013.01); *B26D 1/04* (2013.01); *B29C 65/18* (2013.01);
(Continued)

(58) Field of Classification Search
CPC ............ B65B 9/067; B65B 9/073; B65B 9/08; B65B 9/087; B65B 9/093; B29C 65/7459; B29C 65/7451
(Continued)

(56) References Cited

U.S. PATENT DOCUMENTS 3,940,305 A * 2/1976 Stenberg ................. B29C 65/18
156/515
4,489,536 A * 12/1984 Degn ...................... B65B 9/067
53/450
(Continued)

FOREIGN PATENT DOCUMENTS

CH          647 994 A5    2/1985
CN          1079193 A     12/1993
(Continued)

*Primary Examiner* — Chelsea E Stinson
(74) *Attorney, Agent, or Firm* — David S. Safran; Roberts Mlotkowski Safran Cole & Calderon, P.C.

(57) ABSTRACT

An apparatus for packing articles, wherein the packing is formed by at least one web material, wherein typically a plurality of individual juxtaposed runs of web material and a number of more or less packed articles are conveyed on the runs, wherein the apparatus includes first mechanism which, during packing of articles, joins the web material continuously in its longitudinal direction, as well as other mechanisms for producing individual joints and for separation of the articles in a transverse direction of the web material, wherein the mentioned other mechanisms are arranged on moving means adapted to move in the same direction and at the same speed as the web material and the articles being packed, called the X-axis, and in a direction towards the web material and the articles arranged thereon, called the Y-axis.

9 Claims, 3 Drawing Sheets

(51) Int. Cl.
| | |
|---|---|
| *B29C 65/00* | (2006.01) |
| *B65B 25/00* | (2006.01) |
| *B65B 51/30* | (2006.01) |
| *B65B 57/16* | (2006.01) |
| *B26D 1/04* | (2006.01) |
| *B29C 65/18* | (2006.01) |
| *B29C 65/78* | (2006.01) |
| *B65B 41/12* | (2006.01) |
| *B65B 61/06* | (2006.01) |
| *B65B 59/04* | (2006.01) |
| *B29L 31/00* | (2006.01) |

(52) U.S. Cl.
CPC ...... *B29C 65/7451* (2013.01); *B29C 65/7894* (2013.01); *B29C 66/005* (2013.01); *B29C 66/1122* (2013.01); *B29C 66/4312* (2013.01); *B29C 66/81419* (2013.01); *B29C 66/81431* (2013.01); *B29C 66/8242* (2013.01); *B29C 66/83543* (2013.01); *B29C 66/849* (2013.01); *B29C 66/92611* (2013.01); *B65B 25/007* (2013.01); *B65B 41/12* (2013.01); *B65B 51/30* (2013.01); *B65B 51/303* (2013.01); *B65B 57/16* (2013.01); *B65B 61/06* (2013.01); *B29C 66/8163* (2013.01); *B29C 66/8167* (2013.01); *B29L 2031/7128* (2013.01); *B65B 25/005* (2013.01); *B65B 59/04* (2013.01)

(58) Field of Classification Search
USPC .......................................................... 53/450
See application file for complete search history.

(56) References Cited

U.S. PATENT DOCUMENTS

| | | | | |
|---|---|---|---|---|
| 4,630,429 A | * | 12/1986 | Christine | ................ B29C 65/18 |
| | | | | 156/515 |
| 4,768,327 A | | 9/1988 | Mosher | |
| 5,117,612 A | | 6/1992 | Keim et al. | |
| 5,337,542 A | | 8/1994 | Omori | |
| 5,475,964 A | * | 12/1995 | Fiesser | ................... B65B 9/067 |
| | | | | 53/374.6 |
| 5,787,690 A | | 8/1998 | Konno | |
| 2006/0229180 A1 | * | 10/2006 | Hashimoto | ........... B65B 51/306 |
| | | | | 493/287 |
| 2008/0115638 A1 | * | 5/2008 | Nalle, III | ................. B26D 7/10 |
| | | | | 83/16 |

FOREIGN PATENT DOCUMENTS

| | | |
|---|---|---|
| CN | 1302270 A | 7/2001 |
| CN | 201559818 U | 8/2010 |
| DE | 198 03 838 A1 | 9/1998 |
| EP | 0 845 417 A1 | 6/1998 |
| EP | 0 887 269 A1 | 12/1998 |
| EP | 1 010 620 A1 | 6/2000 |
| EP | 1 116 658 A1 | 7/2001 |
| EP | 1 413 521 A1 | 4/2004 |
| GB | 1 264 568 | 2/1972 |
| GB | 1 457 075 | 12/1976 |
| JP | 2007-191197 A | 8/2007 |
| WO | 00/23327 A1 | 4/2000 |
| WO | 2006/003634 A1 | 1/2006 |
| WO | 2008/107917 A1 | 9/2008 |
| WO | 2012/152528 A1 | 11/2012 |

\* cited by examiner

SEALING AND CUTTING UNIT FOR A FORM FILL SEAL MACHINE

BACKGROUND OF THE INVENTION

Field of the Invention

The present invention concerns an apparatus for packing articles, wherein the packing is formed by at least one web material, wherein typically a plurality of individual juxtaposed runs of web material and a number of more or less packed articles are conveyed on the runs, wherein the apparatus includes first means which, during packing of articles, joins the web material continuously in its longitudinal direction as well as other means for individual joints and for separation in transverse direction of the web material, wherein the mentioned other means are arranged on moving means adapted to move in the same direction and at the same speed as the web material and the articles being packed, called the X-axis, and in a direction against the web material and the articles arranged thereon, called the Y-axis, wherein the apparatus includes at least one individual joining unit for each run of web material and at least one individual cutting unit for each run, wherein the joining unit and the cutting unit are built together as an combined unit, and wherein the combined unit is connected with control means for individual control of the moving pattern and speed of the combined unit.

The invention further concerns a method for packing articles and use of the apparatus and the method, respectively.

Description of Related Art

In connection with the packing of various products, it is commonly known to use so-called "form, fill and seal machines." On these machines, the packing is formed by a web material, typically film webs or paper webs on rolls. In the following, the term film web is used for all types of web material that may be used for packing machines of such a type.

Various embodiments of these machines are used. Some have a vertical filling run and others have a horizontal filling run. For example, for packing coffee and potato chips vertical feeding runs are used where the packing—a bag—is formed by a film web conveyed from above and down against the filling station, whereas other products, such as ice pops or other kinds of confectionery, are packed when lying down, and a film web is formed into a tube around the product in that a longitudinal joint is made and subsequently a transverse joint is made, and separation of the joined products is possibly performed.

This type of packing machine is often provided in immediate connection with production of the article to be packed. It is therefore important that the capacity of the packing machine is at least as high as the capacity of the production facility. Until now, it has been very common to use packing machines of the mentioned type that run discontinuously. This means that a stepwise feeding of the film web is applied, and all processes in the formation of the packing occur by start and stop processes.

SUMMARY OF THE INVENTION

It is the object of the invention to indicate a solution by which is achieved a rapid, secure and exact feeding and sealing of the web material, wherein the web material is sealed longitudinally and transversely in a continuous process, and wherein the system is built up as a mechanical system by which it is possible to adapt the operation of the plant to the actual capacity needs, and where the system is easy to operate and service.

Also, it is the purpose of achieving reduction of packing dimensions in longitudinal and transverse directions by, among others, to achieve better control of the transverse seals between two articles by combining transverse sealing and cutting at one and the same position in order thereby to reduce the area occupied by a joining action.

As indicated in the introduction, the present invention concerns an apparatus and a method for packing articles, wherein the packing is formed by at least one web material, wherein typically a plurality of individual juxtaposed runs of web material and a number of more or less packed articles are conveyed on the runs, wherein the apparatus includes first means which during packing of articles join the web material continuously in its longitudinal direction as well as other means for individual joining and for separation in transverse direction of the web material, wherein the mentioned other means are arranged on moving means adapted to move in the same direction and at the same speed as the web material and the articles being packed, called the X-axis, and in a direction against the web material and the articles arranged thereon, called the Y-axis, wherein the apparatus includes at least one individual joining unit for each run of web material and at least one individual cutting unit for each run, wherein the joining unit and the cutting unit are built together as an combined unit, and wherein the combined unit is connected with control means for individual control of the moving pattern and speed of the combined unit.

The new feature of an apparatus according to the invention is that the apparatus is arranged with the first means as well as the second means in a coinciding and substantially horizontal processing plane;

where the processing plane extends in a direction corresponding to the direction of the X-axis where the packing in this plane is joined in longitudinal direction as well as transverse direction;

where a joining unit and a cutting unit in the combined unit each include means for moving in the Y-axis direction, the means arranged for moving the two units at least partially independently of each other;

where the joining means includes a lower jaw member and an upper jaw member, where the lower as well as the upper jaw members include moving means for moving respective parts in the direction of the Y-axis; and the apparatus further includes sensing means which are connected to control means for determining an expression of the distance between a lower jaw member and an upper jaw member in a set of joining means when the latter are activated.

Hereby is achieved the very great advantage that the mutual positions of the joining unit and the cutting unit are under complete control. It is hereby ensured that a joint can be made and that this joint can be cut into subsequently. Previously, this has been a challenge as dislocation of the film web can occur very easily, while cutting is actually performed beside the joint produced, frequently causing the product to be discarded. Therefore, there is a significantly greater certainty that joining and cutting occur at the right place when using a conjoined unit in which cutting is performed before the joining means are released, the latter thus acting as positioning means during and immediately after the joining. Hereby it is possible perform a very narrow joining which, e.g., may be formed of two narrow weldings with a width of only one millimeter or even less, or more, where between these welds there is a narrow spacing in which cutting is performed by the cutting unit before the film web is released. The welding can thus be minimal, and some film web material can be saved due to the very accurate welds and cuts.

A joint extending transversely to the length of the web material between two articles can be formed very close to the article itself by the invention, as the speed of the joining means relative to the conveying speed of the articles can be matched such that the joining is performed very close to the product. During the joining itself, the joining means as well as articles and the film web are moved at the same speed, but until the joining means are in contact, the speed may advantageously be adapted such that the joining means are closed around the film at the perfect spot—very close to the article in the packing. The amount of film can hereby be optimized, which obviously is significant to the price of the finally packed product, but is a substantial factor in the total environmental calculation as well.

A joining by an apparatus as described here can be a "hot" as well as a "cold" joint, which, e.g., can be a weld or a joint with a kind of adhesive. The film webs used are typically made of a suitable kind of plastic film and have a thickness between 20 and 80 µm or between 30 and 50 µm, and joining such film webs can take place in an advantageous way in that the film is squeezed between heated joining jaws, whereby the film is welded together. This process is effected by an apparatus according to the invention in that the film web is advanced at a continuous speed as the joining unit and the cutting unit follow the film web during the operation, returning afterwards for performing a subsequent joining and cutting action. An apparatus according to the invention can operate with up to 80 strokes/weldings/cuttings per minute in the case of products such as ice pops, confectionery or similar, which is a considerable capacity.

The apparatus may advantageously be equipped with a gear on the combined unit such that the drive motor or motors moving the unit in direction of the film web do not need to be moved together with the unit itself. Hereby is achieved the advantage that the moved mass is reduced and consequently less energy demanding, obviously allowing the construction of the movable parts to be small in total as well as it does not have to support a relatively heavy motor or other drive unit. Such a drive unit may advantageously include one or more suitable actuators or step motors driving a belt or chain transmission or other suitable transmission.

According to the invention, a joining unit and a cutting unit in the combined unit can each include means for moving in the Y-axis direction, wherein the means are arranged for moving the two units at least partially independently of each other. This means that, e.g., the joining unit can be moved against the film from one side as well as from another side, which advantageously can occur simultaneously whereby a film web can be lifted off the base and squeezed between, e.g., two welding jaws such that the finished packing has a symmetric joint. Alternatively, the joining unit can have a more or less stationary welding jaw at level with the base, and another welding jaw can then perform the entire movement until the two jaws are in contact. Hereby is achieved a packing where the joint is disposed at a side of the product.

According to the invention, the joining means include a lower jaw member and an upper jaw member, where the lower and the upper jaw members, respectively, include moving means for moving respective parts in the Y-axis. The base supporting the products and on which the products are conveyed may advantageously be designed with a slot in which the lower jaw member is arranged such that the base is moved together, thereby following the product and ensuring good support of the product during joining and during cutting.

An apparatus for packing articles according to the invention may advantageously be with joining means that include a lower jaw member and an upper jaw member, wherein the lower and the upper jaw members, respectively, each include at least one integrated heating element by which the jaw members can be heated and so that a film web can be welded together when squeezed by the jaw members. Two heating elements may advantageously be incorporated in each welding jaw for redundancy, and an alarm system may be provided for emitting a signal in case of error on a heating element in a jaw member. Furthermore, there may be arranged a system allowing stronger heating of one jaw member if the temperature of another jaw member is too low due to errors in one or more heating elements. Replacement of the relevant jaw member or members can hereby be prepared in advance, and a minimum of production interruption can be obtained or even avoided entirely as replacement of the faulty parts can be performed after end of production. Thus there is a built-in safety in the jaw members, providing optimised security against the need for stopping production due to a mechanical or electrical failure.

An apparatus for packing articles according to the invention may advantageously be adapted such that the joining means include sensing means which are connected to control means for determining an expression of the distance between a lower jaw member and an upper jaw member in a set of joining means when the latter are activated. Such control means can, e.g., be a sensor that stops the jaws as well as the cutter if the article present in the combined unit is thicker than the expected thickness, which typically will be the film thickness. This may, e.g., be the case if a product in the form of an ice pop has been dislocated on the film web, thereby causing a risk that the jaws are squeezed around the product itself in the form an ice pop or around its stick, or that the cutter is passed through the product or parts thereof. In other words, when a thickness deviating from normal is detected, jaws as well as cutter can be withdrawn without any parts being contaminated by the product. Inadvertent or inexpedient welding and cutting are hereby prevented. For example, it may be the case that a cutter in the cutting unit is retained for 50 milliseconds after the jaws have come into position. During that time, it is decided whether the jaws are disposed at an acceptable mutual distance, and whether it therefore can be allowed that the cutting function is activated as well. If everything is as expected, cutting is performed, and if not, the jaws are withdrawn and the cutting unit is not activated. This may, of course, entail that an alarm is given off about a deficiency in the product row in question. This can be a isolated error or a more permanent error which then can be corrected or addressed without needing to stop the production in order to clean and/or repair a damage.

In connection with packing of confectionery articles, it has appeared that precisely cleaning of the apparatus is time-consuming and not the less problematic as the entire production has to be stopped during such cleaning. It is thus very expedient to avoid such stops due to a misplaced product causing contamination of the joining means and the cutting unit. Such contamination will mean that joining means and cutter stick to the web material, and that the packings become dirty on the outer side. As mentioned, it will also cause interruption of operation.

In an apparatus for packing articles according to the invention, the cutting unit may include at least one cutter which is fixed to a cutter holder by a fixing device, a so-called quick-release device including spring-biased fixing means. Hereby, it is possible to replace a cutter rapidly without use of tools or other kinds of adjustment. A cutter can, e.g., be provided with a recess or similar which is brought in contact with a corresponding projection or similar such that the cutter is in an unequivocal position it which it can be fixed by, e.g., spring-biased locking pins or other suitable means. A cutter is typically replaced if it is no longer sharp enough, is deficient in other ways or if the visual shape of the cut is to be changed to a different one, e.g., a change between a straight cut and a zigzag shape of the cut itself. Regardless of the cause, it is advantageous to enable as rapid and simple a change of the cutter as possible.

In a variant of an apparatus for packing articles according to the invention, the combined unit includes a number of energy supply lines, including, e.g., electric and pneumatic lines, the lines being coupled to the apparatus itself for packing articles via one or more couplings/plugs and sockets. One combined unit is thus easily replaced by another as the unit can readily be uncoupled and coupled via these couplings/plugs and sockets. There may, e.g., be one coupling for pneumatic lines and one for electric lines, but there may also be provided only one coupling including all types of lines connecting the unit with the general apparatus or packing facility. By such couplings or plugs, a combined unit according to the invention can be replaced in about one minute after which the production can be resumed.

In an embodiment of an apparatus for packing articles according to the invention, the combined unit can include pneumatic moving means for upward and downward movement in direction of the Y-axis, where a lower as well as an upper jaw member, respectively, in the joining unit is connected with at least one, preferably two, pneumatic actuators, and where the cutting unit further includes individual, preferably pneumatic moving means for upward and downward movement along the Y-axis. By using pneumatic actuators for the joining unit and the cutting unit there is achieved a reliable and stable construction, and at the same time is achieved the advantage that the pneumatic actuators in principle act as springs and respective jaws can be more easily aligned with each other. This is particularly relevant where the jaws have a certain length and are mounted and moved by, e.g., two pneumatic actuators for each jaw member. An imbalance arising in the surface pressure directed towards the film to be joined is hereby prevented as the resilient action causes the jaws to squeeze uniformly.

Yet a detail of an apparatus for packing articles according to the invention is peculiar in that the combined unit includes a strickle that includes at least one movable device arranged beside the upper jaw member, where the movable device, which includes an actuator, is adapted for movement in direction against the web material. A strickle is in principle a device which by a movement ensures that the film after joining is removed from a jaw member if the film sticks to the jaw. It may, for example, be that a kind of adherence to one of the jaw members has occurred in connection with welding—heating and pressure on the film. Such an adherence can, of course, entail that the products will stick and that the production has to be interrupted in order to tidy up and in the worst case clean the base, the joining unit and the cutting unit. Activation of one or more of these stricklers may advantageously be released after the web material is joined and cut in order prevent the web material from sticking to a jaw member, in particular the upper one. A c thus has a movable hold-down ensuring that the product remains lying on the table when the upper jaws are elevated after ending the joining action.

An apparatus for packing articles according to the invention may include a coupling station for at least one additional combined unit, where the additional combined unit or units are coupled to a source of energy for heating one or more of respective jaw members in the joining unit. It is thus possible to have an extra unit standing ready and with hot jaws for immediate use. The only requirement is a change which as mentioned can be performed in about one minute. If the combined unit is not ready and connected to a source of energy, the time from production stop to start will take longer time. Not because the change takes longer time, but because the jaw members on the joining unit have to be heated to operational temperature before the production can be resumed. With a coupling station by which the unit is connected to a source of energy, the unit can be held with heated jaws and stand ready for operation immediately after mounting.

The present invention also concerns a method for packing articles with an apparatus as indicated above, wherein the packing is formed by at least one web material, wherein typically a plurality of individual juxtaposed runs of web material and a number of more or less packed articles are conveyed on the runs, wherein the apparatus includes first means which during packing of articles join the web material continuously in its longitudinal direction, as well as other means for individual joints and for separation in transverse direction of the web material, wherein the mentioned other means are arranged on moving means adapted to move in the same direction and at the same speed as the web material and the articles being packed, called the X-axis, and in a direction against the web material and the articles arranged thereon, called the Y-axis.

The method includes at least operation of an individual joining unit for each run of web material and operation of at least one individual cutting unit, and at least one or more of the following steps:
    placing an article on the web material;
    joining web material in the X-axis direction by the first means;
    activating joining means by jaw members for movement in direction of the Y-axis for individual joining in the transverse direction of the web material;
    detecting thickness of material between activated jaw members;
    joining of web material;
    activating cutter for cutting joined web material transversely;
    withdrawing of a cutter;
    withdrawing of joining means;
    activating a bag strickle.

The method for packing articles according to the invention may further include the following steps:
    detecting the thickness of material between activated jaw members;
    interrupting the joining of web material in transverse direction, by detection of a value for the thickness which is greater than an allowable value, whereby the cutter is held back and the activated jaw members withdrawn.

In cases where a thickness exceeding a certain value is detected, no activation of the cutter is performed, and therefore, no cutting of film either, and thereby of a possible product or part thereof which may be squeezed between the two jaws. Such a thickness which is greater than expected can, e.g., be a wooden stick in an ice pop or it can be the confectionery/ice cream itself which is dislocated on the film web. By disrupting joining and cutting action, it is ensured that the product is not squashed, bursting the packing, and dispersed on the surfaces of the apparatus. Such a contamination with product will entail immediate need for interruption of production and subsequent cleaning, which are entirely undesirable.

This withdrawal can, as mentioned, include that also the jaws are retracted after only a very short contact and detection of thickness/distance between them. Possible contamination of the jaws can hereby be prevented as a welding is not performed or interrupted untimely and so that no heating of the film and, e.g., a product in the form of an ice pop or other confection occurs.

Finally, the invention comprises use of an apparatus or a method for packing articles as indicated above wherein the apparatus or the method is used for packing confectionery articles, preferably frozen ice confectionery, wherein the produced confectionery articles are put on the web material which is brought to envelope the article, after which the web material is sealed longitudinally and transversely while conveyed.

The invention is described in more detail with reference to the drawing, wherein:

DETAILED DESCRIPTION OF THE INVENTION

Figure 1:
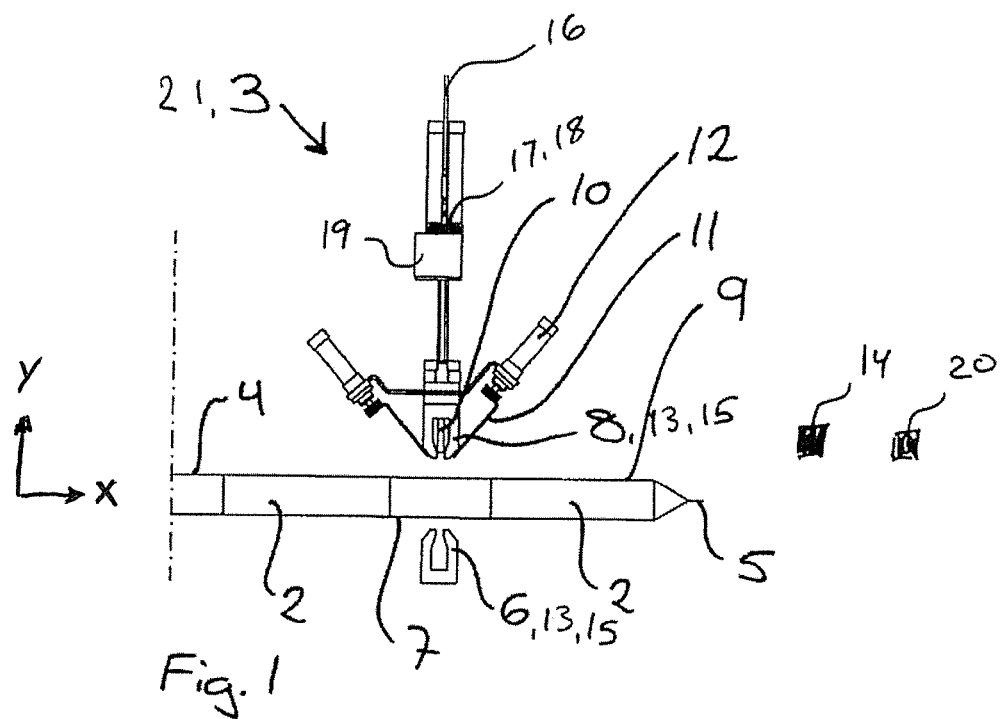
FIGS. 1 to 6 show a combined unit according to the invention in various steps of the process of the invention.

The apparatus according to the invention has a joining means and a cutting means combined together in a unit, each of the joining and cutting means having means for moving in the Y-axis direction at least partially independently of each other. The joining means includes a lower jaw member 6 and an upper jaw member 8, where the lower as well as the upper jaw members include moving means 21 for moving respective parts thereof in the direction of the Y-axis. The apparatus also includes sensing means 13 which are connected to control means 14 for determining the distance between the lower jaw member 8 and an upper jaw member 8 in a set of joining means when the latter are activated, and for stopping the jaws as well as the cutter if the article present in the combined unit is thicker than the expected thickness, which typically will be the film thickness.

The joining unit can be one that produces a "hot" or a "cold" joint, which, e.g., can be a weld or an adhesive joint. The film webs used are typically made of a suitable kind of plastic film and have a thickness between 20 and 80 μm or between 30 and 50 μm, and joining such film webs can take place in an advantageous way in that the film is squeezed between the joining jaws 6, 8, which are provided with a heating means 15 by which the film is welded together.

The combined joining and cutting unit according to the invention has moving means 21 that moves the combined joining and cutting unit so as to follow the film web during the joining and cutting operations, and returning afterwards for performing a subsequent joining and cutting operation. An apparatus according to the invention can operate with up to 80 strokes/weldings/cuttings per minute in the case of products such as ice pops, confectionery or similar, which is a considerable capacity.

The combined joining and cutting unit includes a number of energy supply lines 16, including, e.g., electric and pneumatic lines, the lines being coupled to the apparatus itself for packing articles via one or more couplings/plugs 17 and sockets 18. One combined unit is thus easily replaced by another as the unit can readily be uncoupled and coupled via these couplings/plugs and sockets. There may, e.g., be one coupling for pneumatic lines and one for electric lines, but there may also be provided only one coupling including all types of lines connecting the unit with the general apparatus or packing facility. By such couplings or plugs, a combined unit according to the invention can be replaced in about one minute after which the production can be resumed.

In this regard, the apparatus according to the invention may include a coupling station 20 for at least one additional combined unit, where the additional combined unit or units are coupled to a source of energy for heating one or more of respective jaw members in the joining unit. It is thus possible to have an extra unit standing ready with hot jaws for immediate use. If the combined unit is not ready and connected to a source of energy, the time from production stop to start will take longer time. Not because the change takes longer time, but because the jaw members on the joining unit have to be heated to operational temperature before the production can be resumed. With a coupling station by which the unit is connected to a source of energy, the joining and cutting unit can be held with heated jaws and stand ready for operation immediately after mounting.

The combined unit can include pneumatic actuators for upward and downward movement in direction of the Y-axis, where a lower jaw member 6 as well as an upper jaw member 8, respectively, is connected with at least one, preferably two, pneumatic actuators, and where the cutting unit further includes individual, preferably pneumatic moving means for upward and downward movement along the Y-axis. By using pneumatic actuators for the joining unit and the cutting unit there is achieved a reliable and stable construction, and at the same time, the advantage that the pneumatic actuators in principle act as springs is achieved and the respective jaws 6, 8 can be more easily aligned with each other. This is particularly relevant where the jaws 6, 8 have a certain length and are mounted and moved by, e.g., two pneumatic actuators for each jaw member. An imbalance arising in the surface pressure directed towards the film to be joined is thereby prevented as the resilient action causes the jaws to squeeze uniformly.

In FIGS. 1 to 6, various steps during use of the apparatus for packing ice confectionery 2 are shown, which are simply termed products 2 in the following. All six figures are shown with the same components in a combined unit 3, but in various mutual positions and in various positions relative to the starting position which is marked by a vertical broken line.

In FIG. 1, two products 2 appear enveloped by a film web 4. The film web 4 is joined at the outermost end 5, and the combined unit 3 is positioned and ready to perform a joining and cutting. The lower jaws 6 are disposed immediately below the lower side 7 of the film web 4 whereas the upper jaws 8 are disposed immediately over the upper side 9 of the film web 4. The lower jaws 6 are shown here without any kind of actuator, but it is pointed out that the jaws 6 are connected with other parts which can cause movement to be performed.

The cutter 10, which is arranged to cut the film web 4 after joining, is shown between the upper jaws 8. Two strickles 11 also appear at the upper jaws 8, one at each side of the jaws 8. Both of the strickles 11 can be actuated by pneumatic actuators 12.

Figure 2:
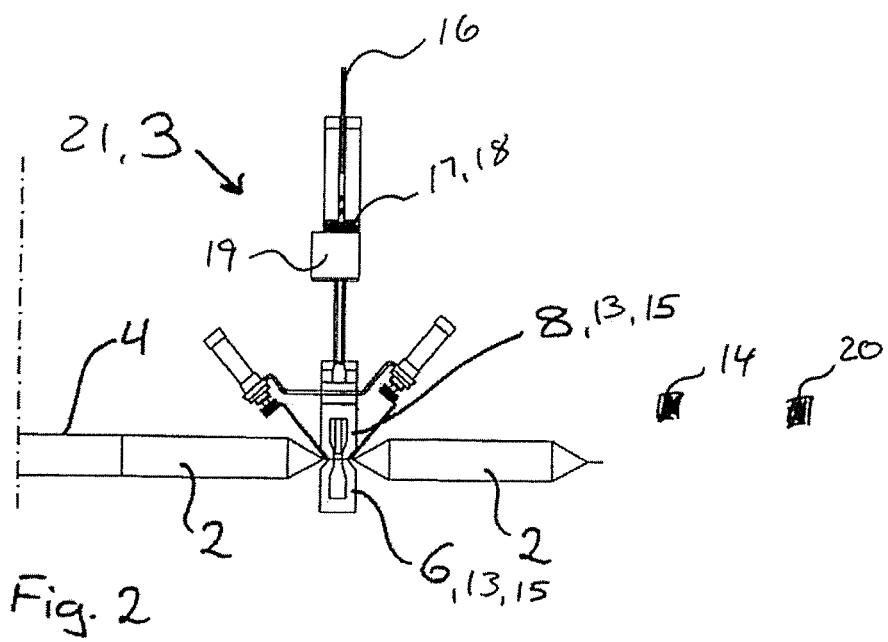

In FIG. 2, the jaws 6, 8 are seen squeezed against the film web 4 at a location between two products 2. The cutter is not yet activated as the jaws 6, 8 are to perform the joining first.

Figure 3:
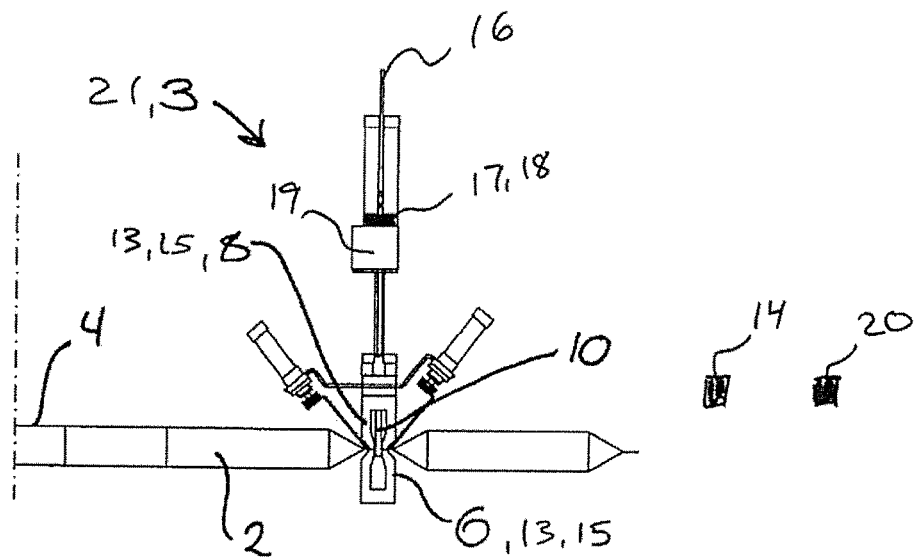

FIG. 3 shows a situation where the cutter 10 breaks through the film web 4 which remains fixed between the two jaws 6, 8. The jaws 6, 8 are made with a slot between two parallel jaw portions such that the cutter 10 can be moved out through the upper jaws 8 and in between the lower jaws 6.

Figure 4:
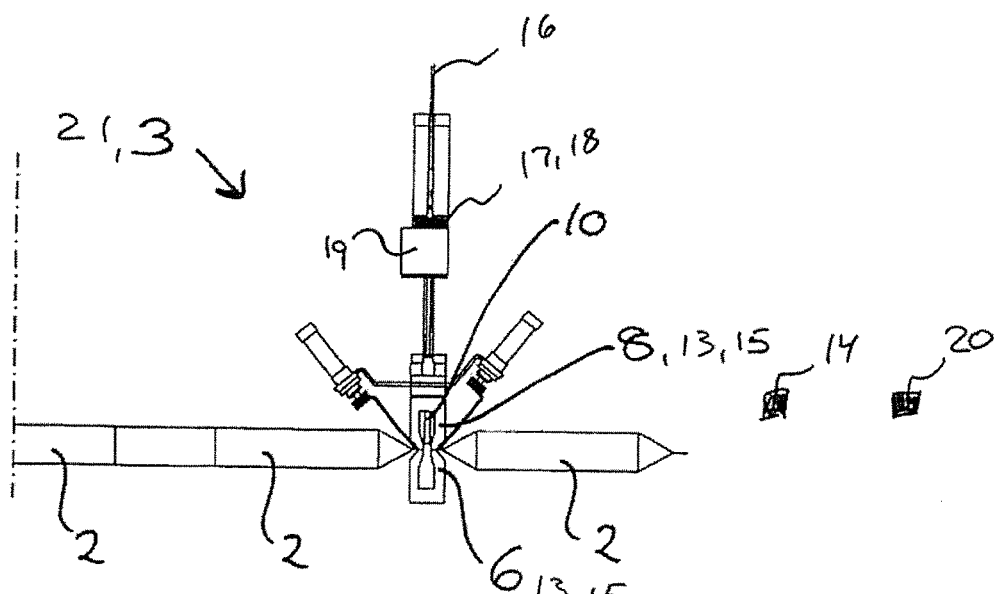

In FIG. 4, the cutter 10 is retracted again to the position between the upper jaws 8, and immediately after that the strickles 11 are activated by the actuators 12, and the two jaws 6, 8 are drawn away from each other. Since the products 2 rest on a base (not shown) which will act as a retainer when the lower jaws 6 are retracted, and thus, there is no risk that the film web 4 will be stuck on the lower jaws 6. In the same way, by activating the strickles 11, there is ensured a hold-down providing that possible adherence between film web 4 and the upper jaws 8 is prevented or disrupted.

Figure 5:
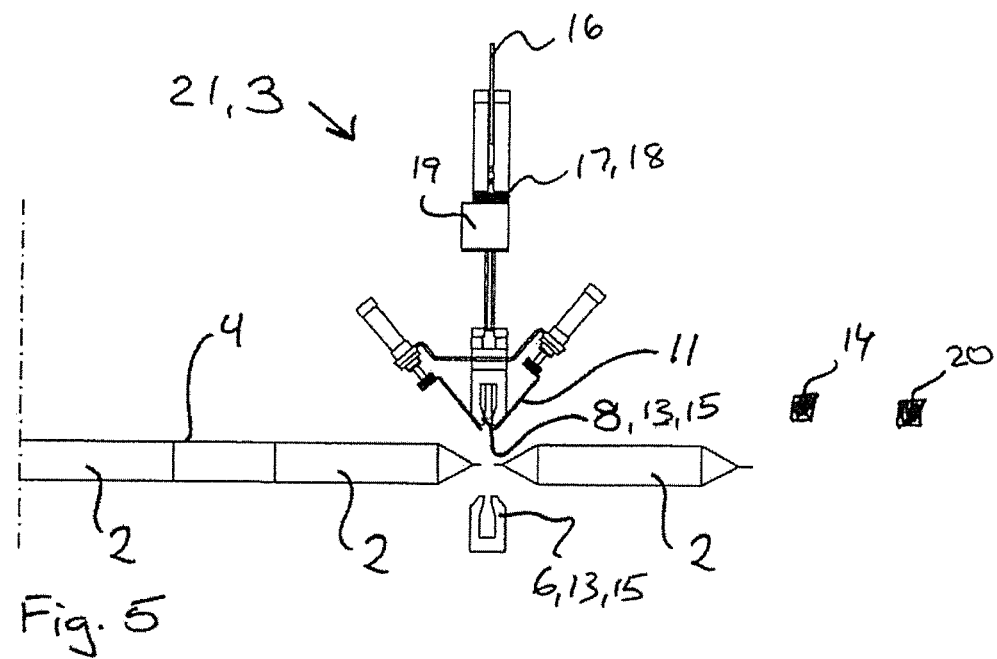

In FIG. 5, the strickles 11 are seen in their extended and activated position in which the outermost edges of the stricklers extend beyond the jaws 8, and they are in principle retracted to their starting position immediately after the upper jaw 8 has returned to the starting position above the film web 4 and the products 2, as shown in this figure. Moreover, in FIG. 4, a packed product 2 which has been cut off from the film web 4 is shown.

Figure 6:
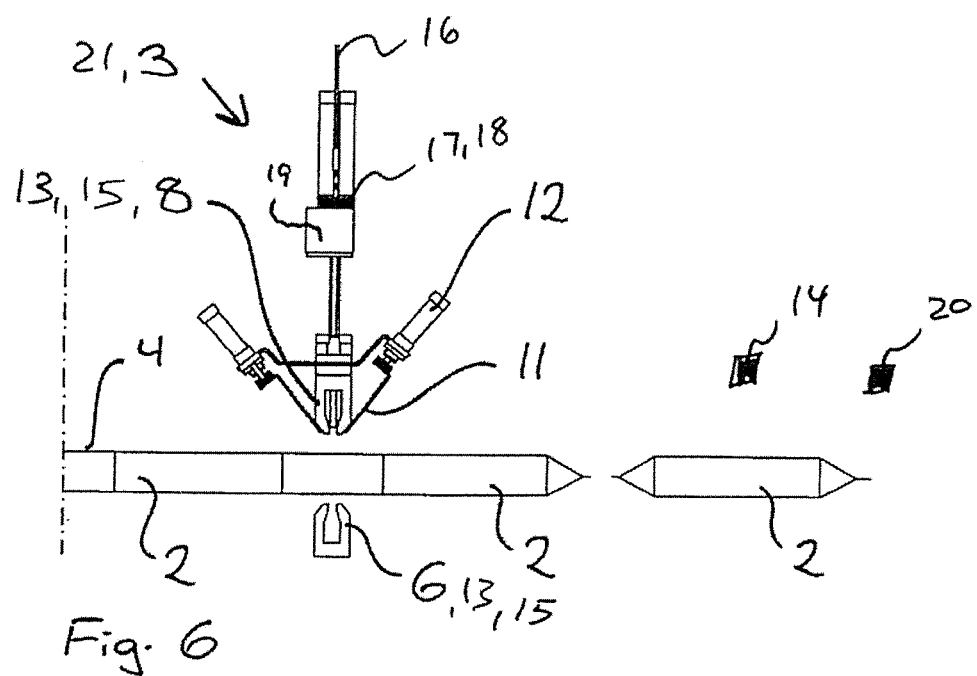

FIG. 6, in principle, is the same as FIG. 1 as the combined unit 3 is now back in the starting position and ready to perform the next joining and separating of the film web 4 between two products 2.

Moreover, it is apparent that the person of ordinary skill in the art, after being informed of the present invention, may design devices with similar properties, but where all or some of these properties are achieved by other means that those shown here. Such solutions are regarded as obvious for a skilled in the art after reading this document and are intended to be encompassed by the present invention.

What is claimed is:

1. An apparatus for packing ice cream articles, wherein the packing is formed by at least one film web material, and packed articles are conveyed on runs, wherein the apparatus includes first means which during packing of articles join the web material continuously in its longitudinal direction as well as other means for producing individual joints and for separation of packed articles in a transverse direction of the web material, wherein said other means are arranged on moving means adapted to move in the same direction and at the same speed as the web material and the articles being packed, called the direction of the X-axis, and in a direction toward the web material and the articles arranged thereon, called the direction of the Y-axis, wherein the apparatus includes at least one individual joining unit for each run of web material and at least one individual cutting unit for each run, wherein the joining unit and the cutting unit are built together as a combined unit, and wherein the combined unit is connected with control means for individual control of the moving pattern and speed of the combined unit, wherein the apparatus is arranged with the first means as well as the second means in a coinciding and substantially horizontal processing plane;

where the processing plane extends in a direction corresponding to the direction of the X-axis where the packing in this plane is joined in a longitudinal direction as well as the transverse direction;

where a joining unit and a cutting unit in the combined unit each include means for moving in the Y-axis direction at least partially independently of each other;

where the joining means includes a lower jaw member and an upper jaw member, where the lower as well as the upper jaw members include moving means for moving respective parts in the direction of the Y-axis;

wherein the apparatus further includes sensing means which are connected to control means for determining an expression of the distance between a lower jaw member and an upper jaw member in a set of joining means when the latter are activated, the speed of the joining unit and the cutting unit relative to the conveying speed of the articles is adjustable in the direction of the X-axis on means for moving in the X-axis direction such that the joining unit and the cutting unit move in the same direction and at the same speed as the film web material and the articles being packed to enable joining to be performed close to the product, and wherein the combined unit includes a strickle having a movable hold-down ensuring that the product remains lying on the table when the upper jaws are elevated after ending the joining action, the strickle including at least one movable device arranged beside the upper jaw member for removing any film web material that sticks to the upper jaw member, where the movable device, which includes an actuator, is adapted for movement of the hold-down in a direction against the film web material for holding down the film web material during elevation of the upper jaws.

2. Apparatus for packing articles according to claim 1, wherein the lower as well as the upper jaw members each include at least one integrated heating element by which the jaw members can be heated and so that the film web material can be welded together when squeezed by the jaw members.

3. Apparatus for packing articles according to claim 1, wherein the cutting unit includes at least one cutter which is fixed to a cutter holder by a fixing device, the fixing device being a quick-release device including spring-biased fixing means.

4. Apparatus for packing articles according to claim 1, wherein the combined unit includes pneumatic moving means for upward and downward movement in direction of the Y-axis, where a lower as well as an upper jaw member, respectively, in the joining unit is connected with at least one, preferably two, pneumatic actuators, and where the cutting unit further includes individual moving means for upward and downward movement along the Y-axis.

5. Apparatus for packing articles according to claim 1, wherein the apparatus includes a coupling station for at least one additional combined unit, where the additional combined unit or units are coupled to a source of energy of the coupling station for heating one or more of respective jaw members in the joining unit.

6. Apparatus for packing articles according to claim 5, wherein the combined unit includes a number of energy supply lines coupled to the source of energy of the coupling station via one or more couplings/plugs and sockets for providing energy to the combined unit.

7. A method for packing ice cream articles by an apparatus wherein the packing is formed by at least one web material, wherein the apparatus includes first means which during packing of articles join the web material continuously in its longitudinal direction as well as other means for forming individual joints and for separation of articles in a transverse direction of the web material, wherein the other means are arranged on moving means adapted to move in the same direction and at the same speed as the web material and the articles being packed, called the X-axis, and in a direction against the web material and the articles arranged thereon, called the Y-axis, wherein the method at least includes operation of one individual joining unit for each run of web material and operation of at least one individual cutting unit, and at least one or more of the following steps:

placing an article on the web material;

joining web material in the X-axis direction by the first means;

activating joining means by jaw members for movement in direction of the Y-axis for individual joining in the transverse direction of the web material;

detecting thickness of material between activated jaw members;

joining of web material in transverse direction by a joining unit;

then activating a cutter and moving the cutter independently from the joining unit for cutting joined web material transversely;

then withdrawal of the cutter independently of the joining unit;

and then withdrawal of joining means;

activating a stickler, including at least one movable device arranged beside the upper jaw members, for removing any film web material that sticks to the jaw members, and adjusting the speed of the joining unit and the cutting unit in the direction of the X-axis to move the joining unit and the cutting unit in the same direction and at the same speed as the film web material and the articles being packed such that the joining is performed close to the product.

8. Method for packing articles according to claim 7, wherein the method further includes the following steps:

detecting thickness of material while the material is between activated jaw members;

by a detected value for the thickness which is greater than an allowable value that is greater than the thickness of the web material, interrupting joining of web material in transverse direction, the cutter being retained and the activated jaw members withdrawn as a means for preventing the jaw members squeezing the ice cream article itself and for preventing the cutter passing through the ice cream article or part thereof.

9. Apparatus for packing articles according to claim 1, further comprising:

means for detecting thickness of material while the material is between activated jaw members; and safety means, responsive to detection of a value for the thickness which is greater than an allowable value, for interrupting transverse joining of the web material, retaining the cutter and withdrawing the activated jaw members for preventing the jaw members from squeezing the ice cream article itself and for preventing the cutter from passing through the ice cream article or part thereof.

* * * * *